Jan. 13, 1931.     C. W. CHERRY     1,789,217
WINDSHIELD WIPER
Original Filed June 21, 1929
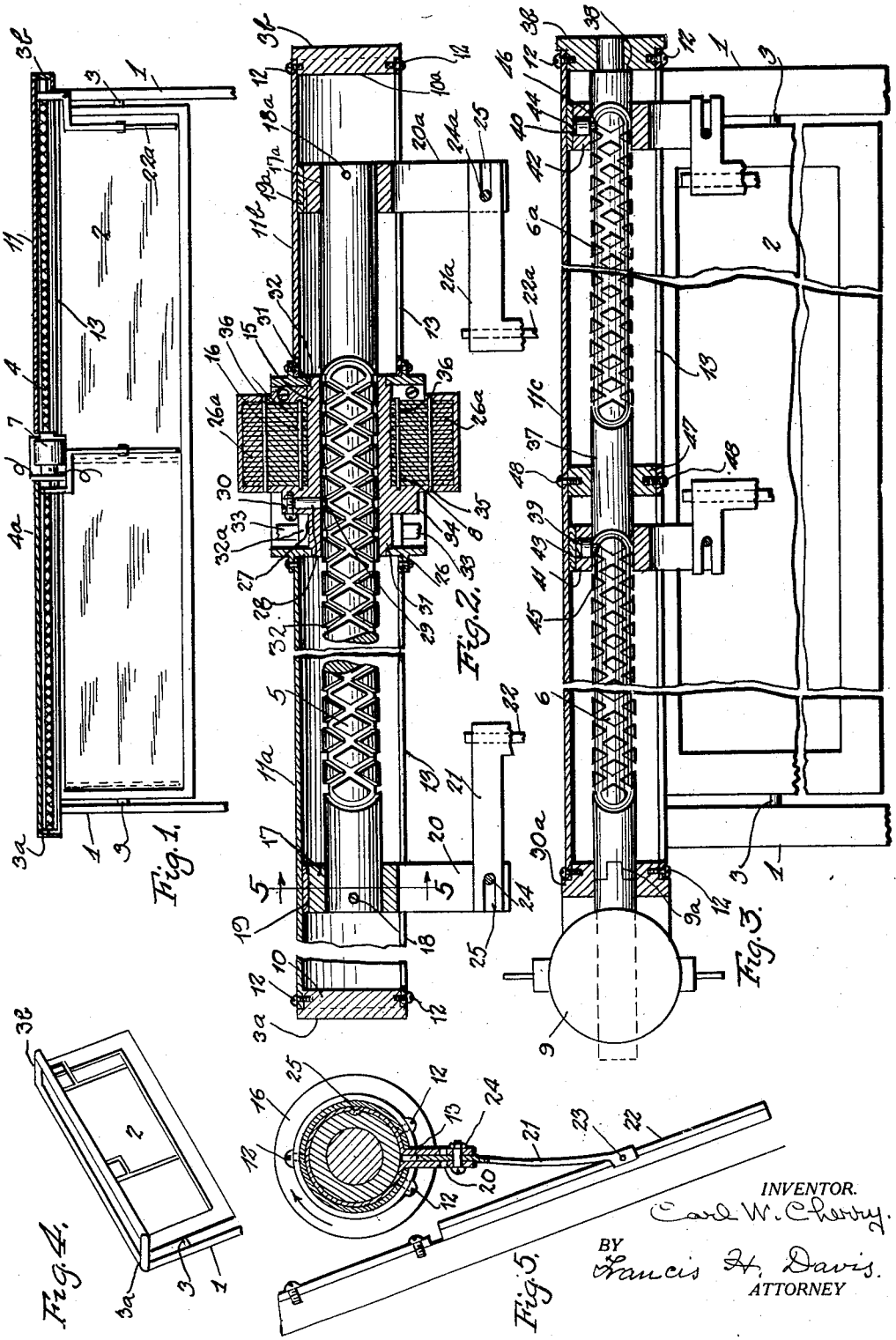

Patented Jan. 13, 1931

1,789,217

UNITED STATES PATENT OFFICE

CARL W. CHERRY, OF CARMEL, CALIFORNIA

WINDSHIELD WIPER

Application filed June 21, 1929, Serial No. 372,742. Renewed July 17, 1930.

The present invention relates broadly to windshield wipers, but more particularly to a type of windshield wiper that is adapted to carry one or more wiping elements across the winshield glass from side to side for the full breadth thereof.

My invention has for its objects the following desideratums:—

To provide a device of this character that will traverse one or more vertically-disposed wiper or squeegee elements in a horizontal to and fro line across a windshield so as to wipe away any accumulation of moisture or the like from the outer surface of the windshield glass.

To provide horizontally-disposed cylindrical-Horsfall-screw elements adapted to impart lateral to and fro movement to wiper or squeegee members contacting with the outer surface of a windshield glass.

To provide suitable means for supporting and housing said screws, and means for attachment thereof to the frame which supports the windshield.

To provide electrically-driven means to impart movement to the screws for actuation of said wiper element or elements.

To provide means whereby part of the power used to traverse the wiper elements will be expended in maintaining the wiper elements in close contact with the surface of said glass.

To provide a cylindrical guide-tube to house the screw elements the tube being suitably slotted on its under side for axial play therein of the wiping elements, and bracing means for attaching said tube to the relatively stationary frame that carries the windshield.

To provide inter-related members adapted to coact with the endless grooves of said screws, said members being disposed with their axes at right angles to those of said screws, the members being adaptable for relative pivotal movement within a cylindrical hole in a body centrally perforated to receive said cam.

To provide certain clamps adapted to retain the members aforesaid in place within the said cylindrical hole in such manner as to be free for relative pivotal movement. Said clamps encircling said bodies so as to be a working fit within said guide-tube the lower end of said clamps being adapted to carry said wiping element to and fro along the interrelated slot of said guide-tube.

To provide a novel quill element forming the axis of a driving armature, said quill being adapted to carry a driving member acting upon a cylinder screw carrying wiper elements across a windshield.

With the foregoing and other advantages, the invention consists in the novel construction and arrangement of parts, particularly specified in the claims and illustrated by the accompanying drawings, in which:—

Figure 1 is a longitudinally mid-sectional front view of one embodiment of my invention.

Fig. 2 is a longitudinally mid-sectional view of a preferred embodiment of my invention.

Fig. 3 is a similar view of a third embodiment of my invention.

Fig. 4 is a diagrammatic-projectional view illustrating the relative position of the device to the windshield and to the relatively stationary supporting frame.

Fig. 5 is a cross-section taken on the line 5—5 of Fig. 2.

Similar reference characters refer to similar parts throughout the several views.

In the drawings the numeral 1 designates a relatively stationary supporting frame carrying the windshield 2 mounted therein by the pivots 3—3, well shown in Figs. 1 and 3.

The horizontally-disposed braces 3a and 3b are rigidly secured to the frame 1, being provided with the respective bosses 10 and 10a which are adapted to center and support the respective ends of the guide-tubes 11, 11a and 11b or 11c as the case may be, the tubes being secured to the bosses by the screws 12, well shown in Figs. 2, 3 and 5. Said guide tube is preferably of steel or brass tubing very smooth and true in the bore and suitably provided on the under side with the longitudinal slots 13 for a purpose to be explained.

In Fig. 2 the preferred embodiment of my invention, the Horsfall screw 5 is concentrically mounted in said guide-tube in three bearings; namely, the center bearing 15 which forms a hollow shaft or quill for the armature 16, the left-hand bearing comprising the collar 17 secured to the respective end of said screw by the pin 18, the clamp 19 completely encircling said collar save where the depending ends 20 thereof project downwardly through the slot 13 to clamp the arm 21 which carries the squeegee element 22 by being pivoted thereto at 23. Said clamp members being secured together by the bolt 24. It should be noted that the collar 17 is such diameter that when the clamp 19 fits therearound the latter is a free slidable fit within the tube 11, said clamp besides being held securely in place on the end of the screw 5 by the tightening action of the bolt 24 is further held against movement with relation to said shaft by the dimple and counter-part 25, well shown in Fig. 3. The right hand end of the cam 5 being similarly provided with the collar 17a, pin 18a, clamp 19a, depending ends 20a, arm 21a, bolt 24a, and the complement squeegee member 22a, it being observed that said arms are off-set equidistantly to face each other, and also that the clamped ends of said arms are provided with the slots 25 for regulative adjustment of said squeegee elements that they may completely cover the lateral distance of the windshield 2.

The quill-like member 15 is journaled in the frame 26 the latter being rigidly secured to the frame 1 at a point intermediate the braces 3a and 3b which will admit of said squeegee elements just lapping over each other's area when at the inner ends of their respective strokes.

As arranged in Fig. 2 the screw 5 is moved from left to right by the driving member 27 carried by the armature 15. Said member is housed in the cylindrical perforation 28 disposed at right angles to the screw. The body of said member is cylindrical, whereas the driver end is adapted to engage with the groove of the screw, the upper end of the member being somewhat rounded and is held loosely in place by the screw pin 30.

The armature quill-shaft 15 is reduced at each end to form the shoulders 31—31 which prevent longitudinal displacement in the bearings 32—32 of the frame 26 which being of light-gauge metal may be sprung apart to receive said quill.

The commutator 32a is suitably mounted on the quill 15 between said member and the adjacent portion of the frame 25, suitable brushes 33—33 are provided but the other details of a conventional motor are not described as forming no part of the present invention; the said armature and quill-bearing however are described in particular as being novel and forming essential elements of the invention.

The portion 34 to the right of said commutator, forms a flange in which the driving member 27 is mounted, and to the right of said flange is the armature flange 35 to which the armature laminations are secured by the bolts 36—36. In this preferred form the screw element is single and non-revoluble.

In the second embodiment as shown in Fig. 1, and in the third embodiment according to Fig. 3, the respective screw elements 4a and 4 and 6 and 6a are identically alike as to construction, there being one cylindrical Horsfall screw on each side of a plain shaft portion 37, well shown in Fig. 3. In both instances the screws are revoluble, those in Fig. 1 being driven by the conventional motor 7 keyed fast to said plain portion; whereas, in Fig. 3 the cams 6 and 6a are driven by the symbolically shown motor 9, the shaft of which makes slotted connection with the left hand end of the screw 6, the respective ends of said screws being journaled in suitable perforations in the brace members 3a and 3b.

As shown in Fig. 3 the right-hand end of the screw 6a is turned down to form the shoulder 38 which prevents axial displacement to the right while the motor 9 prevents such displacement to the left. In the construction according to Fig. 1 both said screw ends are turned down as shown at 38, Fig. 3.

In Fig. 3 the followers 39 and 40 are mounted in the collars 41 and 42 respectively, being held loosely in place by the respective clamp elements 43 and 44. Said followers are adapted for relative pivotal movement, while their lower portions 45 and 46 which are conformed to interengage with their respective screws make the necessary rotative adjustment required while following the lead of the screw in either direction.

In both said embodiments the specific details relative to the arms 21—21a and the respective clamps and squeegees are the same as those described in Fig. 2 except that in the case of Figs. 1 and 3 the said collars move to and fro along the screws while the screws themselves remain longitudinally stationary. In Fig. 3 the bearing 47 centers and supports the middle of the screws 6 and 6a; being secured to the guide tube by the screws 48.

It is obvious that a description of the operation of my device will be superfluous in view of the foregoing.

It should be understood that when assembled in their operative positions the relative position of the squeegee elements and the windshield surface are such as to tense the arms 21—21 and bow them as shown in Fig. 5 by this means said squeegees (which are preferably of rubber) are held in suitable contact with the glass 2.

This strain of said arms produces friction between the contacting surfaces of the related clamp end 20 and contiguous edge of the slot 13 which is overcome by the pull of the motor in the direction of the indicating arrow shown in Fig. 5 which has the effect of applying additional pressure between the squeegee and the glass while at the same time relieving said friction between the clamp end 20 and the edge of said slot, further adjustment of which may be secured by tilting the angle of the windshield 2 round the pivot 3.

It is believed that the construction, operation and advantages of the invention will now be clearly understood. The present embodiments of the invention have been described in detail merely by way of example, since in actual practice they attain the features of advantage set forth as desideratums in the statement of the invention and the above description. Numerous changes in the details of construction, and in the combination and arrangement of parts may be resorted to without departing from the spirit or scope of the invention as hereinafter claimed or sacrificing any of its advantages.

Having thus described my invention, what I claim as new is:—

1. A device of the kind described, comprising in combination, a relatively stationary supporting structure, means carried by the structure to support a slotted guide tube, a cylindrical screw element mounted in said tube, means to impart axial displacement to the screw, and squeegee members actuated by said screw and adapted to be traversed along said slotted tube laterally across a windshield in contact therewith, said members being carried by said screw, a medially disposed bearing within the guide tube concentric therewith and secured thereto, and brace bearings on said screw, said bearings being adapted to coact with said brace bearings to support and center said screw element in said guide tube.

2. A device of the kind described, comprising in combination, a relatively stationary supporting structure, means carried by the structure to support a slotted guide tube, a cylindrical screw element mounted in said tube, means to impart axial displacement to the screw, and squeegee members actuated by said screw and adapted to be traversed along said slotted tube laterally across a windshield in contact therewith, said members being carried by said screw, said guide tube being composed of two sections, each section suitably slotted longitudinally to accommodate lateral movement of said squeegee elements, the outer ends of said tubes being carried and centered by braces, the inner ends of said tubes being supported and aligned by a frame secured to said structure, said frame being provided with bearings adapted to journal a quill-bearing, means carried by said quill to prevent axial displacement thereof, means for imparting variable movement to said quill and means carried by the quill interengaging with the screw and adapted to impart reciprocated rectilinear movement thereto.

3. A device of the kind described, comprising in combination, a relatively stationary supporting structure, means carried by the structure to support a slotted guide tube, a cylindrical screw element mounted in said tube, means to impart axial displacement to the screw, and squeegee members actuated by said screw and adapted to be traversed along said slotted tube laterally across a windshield in contact therewith, said members being carried by said screw, a suitably mounted revoluble bearing for said screw element, a driving member mounted in the bearing, the lower end of said member adapted to engage with said screw and impart longitudinal movement thereto, being mounted in a cylindrical pocket for free axial movement and provided with means to prevent axial displacement of said member relative to the longitudinal axis of said screw.

In testimony whereof I have signed my name to this specification, this 11th day of June, 1929.

CARL W. CHERRY.